(12) United States Patent
Lee et al.

(10) Patent No.: US 7,940,711 B2
(45) Date of Patent: May 10, 2011

(54) NODE DEVICE AND METHOD FOR BEACON SCHEDULING IN AD-HOC NETWORK AND DATA TRANSMITTING METHOD THEREOF

(75) Inventors: Jongyoung Lee, Daejeon (KR); Sun-Joong Kim, Daejeon (KR); Cheol Sig Pyo, Daejeon (KR); Jong-Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 822 days.

(21) Appl. No.: 11/930,874

(22) Filed: Oct. 31, 2007

(65) Prior Publication Data
US 2008/0267121 A1 Oct. 30, 2008

(30) Foreign Application Priority Data
Apr. 30, 2007 (KR) ........................ 10-2007-0042076

(51) Int. Cl.
*G08C 17/00* (2006.01)
(52) U.S. Cl. ...................................................... 370/311
(58) Field of Classification Search .......... 370/310–312, 370/328–339
See application file for complete search history.

(56) References Cited

U.S. PATENT DOCUMENTS

| | | | |
|---|---|---|---|
| 2003/0098777 A1* | 5/2003 | Taylor et al. | 340/5.61 |
| 2006/0104251 A1* | 5/2006 | Park | 370/338 |
| 2006/0270438 A1* | 11/2006 | Choi | 455/522 |
| 2007/0037548 A1 | 2/2007 | Sammour et al. | |
| 2009/0274127 A1* | 11/2009 | Jeong et al. | 370/336 |

FOREIGN PATENT DOCUMENTS

KR 1020060025444 A 3/2006

* cited by examiner

*Primary Examiner* — Frank Duong
(74) *Attorney, Agent, or Firm* — Kile Park Goekjian Reed & McManus PLLC

(57) ABSTRACT

Provided are a device of a node and method for beacon scheduling in an ad-hoc network and a data transmitting method thereof, which reduce power consumptions of nodes in an ad-hoc network when data communications between the nodes occur frequently. A beacon transmitting node checks its residual power. If the residual power is lower than a predetermined level, the beacon transmitting node notifies a plan to change its beacon cycle to other nodes. Thereafter, the beacon transmitting node increases the beacon cycle and transmits a beacon at the increased beacon cycles. Consequently, the beacon transmitting node can change its beacon cycle dynamically according to its power condition. Thus, the life span of the node can be increased. Therefore, it is possible to reduce an overhead of reconstructing a sensor network.

14 Claims, 5 Drawing Sheets

NODE DEVICE AND METHOD FOR BEACON SCHEDULING IN AD-HOC NETWORK AND DATA TRANSMITTING METHOD THEREOF

CROSS-REFERENCE TO RELATED PATENT APPLICATION

This application claims the benefit of Korean Patent Application No. 10-2007-0042076, filed on Apr. 30, 2007, in the Korean Intellectual Property Office, the disclosure of which is incorporated herein in its entirety by reference.

BACKGROUND OF THE INVENTION

1. Field of the Invention

The present invention relates to a device of a node and method for beacon scheduling in an ad-hoc network and a data transmitting method thereof, and more particularly, to a beacon scheduling method for dynamically changing a beacon cycle of a node and a node selecting method for minimizing a data transmission delay.

This work was supported by the IT R&D program of MIC/IITA.[2005-S038-02, Development of UHF RF-ID and Ubiquitous Networking Technology]

2. Description of the Related Art

According to Zigbee network topology, each of nodes in a network system is classified into a Zigbee coordinator (ZC), a Zigbee router (ZR), and a Zigbee end device (ZE).

The ZC is located at the top on a tree structure and manages the entire tree. The ZR is a sub node of the ZC and communicates with the ZC using a beacon received from the ZC. Also, the ZR generates its own beacon, which is free of collision with the beacon of the ZC, to communicate with its sub nodes.

The ZE is located at the bottom on the network topology and performs data communication using the beacon received from the ZR or the ZC. A ZR adjacent to the ZC or a sink node must perform frequent data communications in order to transmit data from ZEs to the sink node. Therefore, a sensor node with limited power such as the ZR rapidly uses up its power and thus fails to serve as a node.

In place of the failed sensor node, another substitute node adjacent to the ZC or the sink node may be used to create a new route. However, the substitute node also loses its function immediately, making it impossible to transmit data from the ZEs to the ZC or the sink node.

SUMMARY OF THE INVENTION

The present invention provides a beacon scheduling device of node and a beacon scheduling method in an ad-hoc network. The rapid power consumption of a sensor node is prevented by increasing the operation interval of the sensor node performing frequent data communication.

The present invention also provides a data transmitting method according to a beacon cycle in an ad-hoc network. The data transmission efficiency of a node is increased using collected beacon information of adjacent nodes.

According to an aspect of the present invention, there is provided a beacon scheduling device of a node in an ad-hoc network, including: a power monitor which checks the residual power of the node; a beacon change notifier which notifies a plan to change a beacon cycle of the node to other nodes if the checked residual power of the node is lower than a predetermined level; a beacon changer which increases the beacon cycle; and a beacon transmitter which transmits a beacon at the increased beacon cycles.

According to another aspect of the present invention, there is provided a beacon scheduling method in an ad-hoc network, including the operations of: checking the residual power of a beacon transmitting node; notifying a plan to change a beacon cycle of the node to other nodes if the checked residual power of the node is lower than a predetermined level; increasing the beacon cycle of the node; and transmitting a beacon at the increased beacon cycles.

According to another aspect of the present invention, there is provided a data transmitting method in an ad-hoc network, including the operations of: collecting, at a first node transmitting data, beacon information of adjacent nodes; selecting a second node with a short beacon cycle based on the collected beacon information of the adjacent nodes; and transmitting the data from the first node through the second node.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
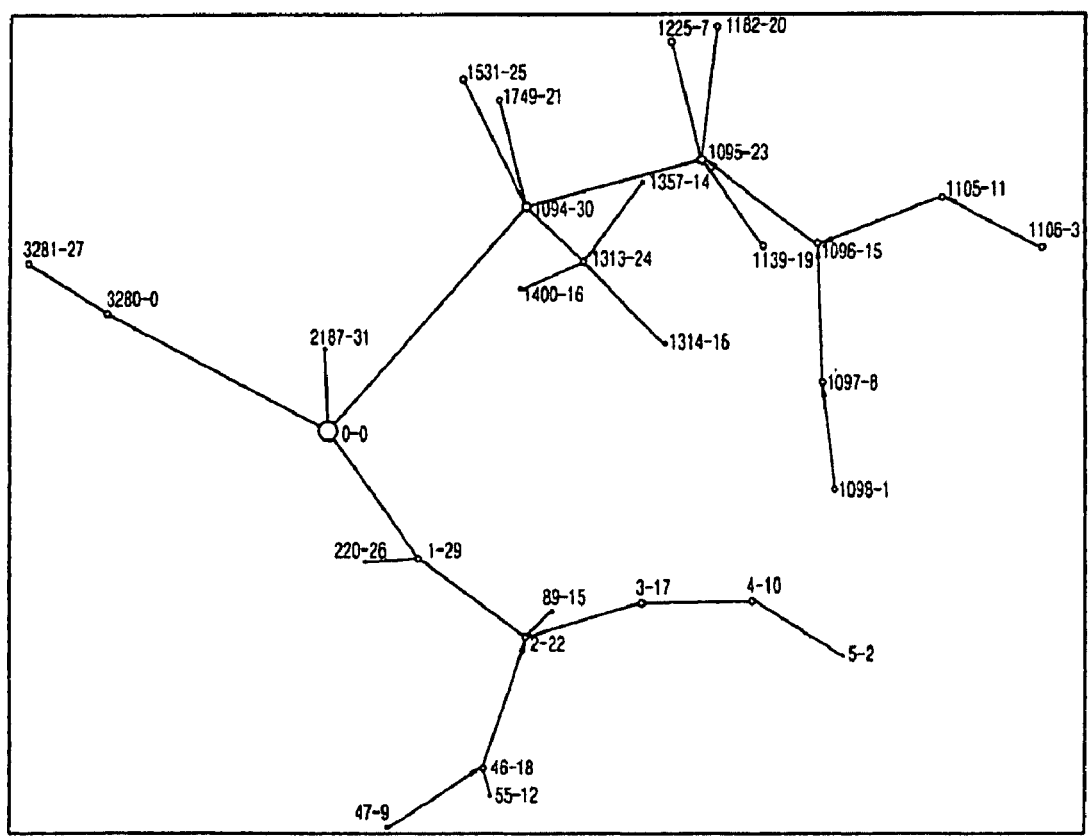
FIG. 1 is a diagram illustrating interconnections between nodes in a general ad-hoc network.

FIG. 1 is a diagram illustrating interconnections between nodes in an ad-hoc network. That is, FIG. 1 illustrates the structure and mode of interconnections between nodes in an ad-hoc network with a tree structure.

Referring to FIG. 1, a sink node with an address value '0' is connected to four child nodes. No sub child nodes or only a few sub child nodes are connected to child nodes having address values '2187' and '3280'. On the other hand, many sub child nodes are connected to child nodes having address values '1' and '1094'. Thus, if both the child nodes having address values '1' and '1094' periodically transmit a predetermined amount of message traffic to the sink node, a large amount of power is consumed for data communication.

Moreover, intermediate nodes having address values '1095' and '1096' also consume a large amount of power in order to transmit data from sub nodes to upper nodes.

Figure 2:
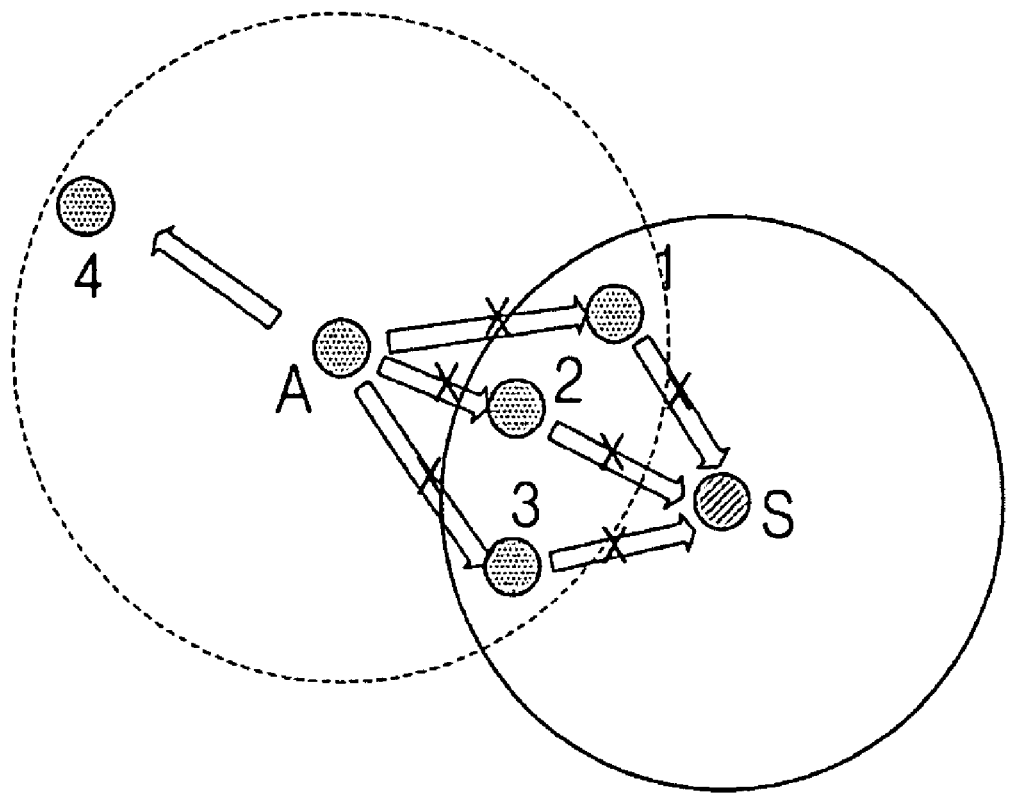
FIG. 2 is a diagram illustrating operations between nodes which communicate frequently with each other in an ad-hoc network.

FIG. 2 is a diagram illustrating operations between nodes which communicate frequently with each other in an ad-hoc network.

That is, FIG. 2 illustrates a situation where data communication is concentrated on nodes adjacent to a sink node. Referring to FIG. 2, at the beginning, a node A connects to a node 2 and transmits data to the node 2. However, when the node 2 is short of power and thus stops operating, the node A searches for adjacent nodes and connects to a node 1. Also, when the node 1 is also short of power and thus stops operating, the node A connects to a node 3 through a searching operation.

Thereafter, when the node 3 also stops operating, the node A connects to a remote detour node in order to transmit data to a sink node S. If there is no adjacent full-function device (FFD), the node A cannot transmit data to the sink node S.

What is therefore required is a method for maximizing the life span of a node adjacent to a sink node while minimizing a data transmission delay.

The present invention provides a beacon scheduling method in an ad-hoc network. The beacon scheduling method includes: periodically checking the residual power of each FFD; notifying a plan to change a beacon cycle of each FFD by broadcasting if the residual power is lower than a predetermined level; and increasing the beacon cycle, changing a beacon payload and transmitting a beacon. The beacon cycle includes information indicating every how many beacon intervals a beacon is to be transmitted.

If an FFD connects to another FFD or transmits data, the beacon scheduling method further includes preferentially selecting an FFD with a short beacon cycle among adjacent FFDs, thereby minimizing a data transmission delay caused by the change of a beacon cycle.

Figure 3:
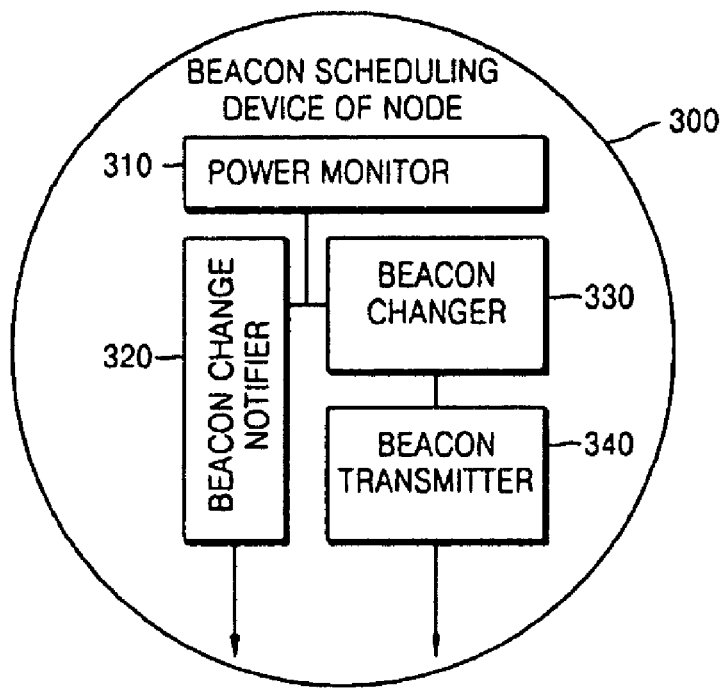
FIG. 3 is a block diagram of a beacon scheduling device of a node in an ad-hoc network according to an embodiment of the present invention.

FIG. 3 is a block diagram of a beacon scheduling device of a node in an ad-hoc network according to an embodiment of the present invention.

Referring to FIG. 3, a beacon scheduling device of a node 300 includes a power monitor 310, a beacon change notifier 320, a beacon changer 330, and a beacon transmitter 340. The power monitor 310 monitors the residual power of the node. If the residual power is lower than a predetermined level, the beacon change notifier 320 notifies a plan to change a beacon cycle to other nodes. If the residual power is lower than the predetermined level, the beacon changer 330 increases a beacon cycle The beacon transmitter 340 transmits a beacon at the increased beacon cycles.

Preferably, the beacon scheduling device of the node 300 is an FFD and the beacon cycle is the multiple of a beacon cycle of a sink node or a coordinator.

More preferably, the power monitor 310 checks the residual power periodically and the beacon changer 330 also increases a beacon payload while increasing the beacon cycle.

Figure 4:
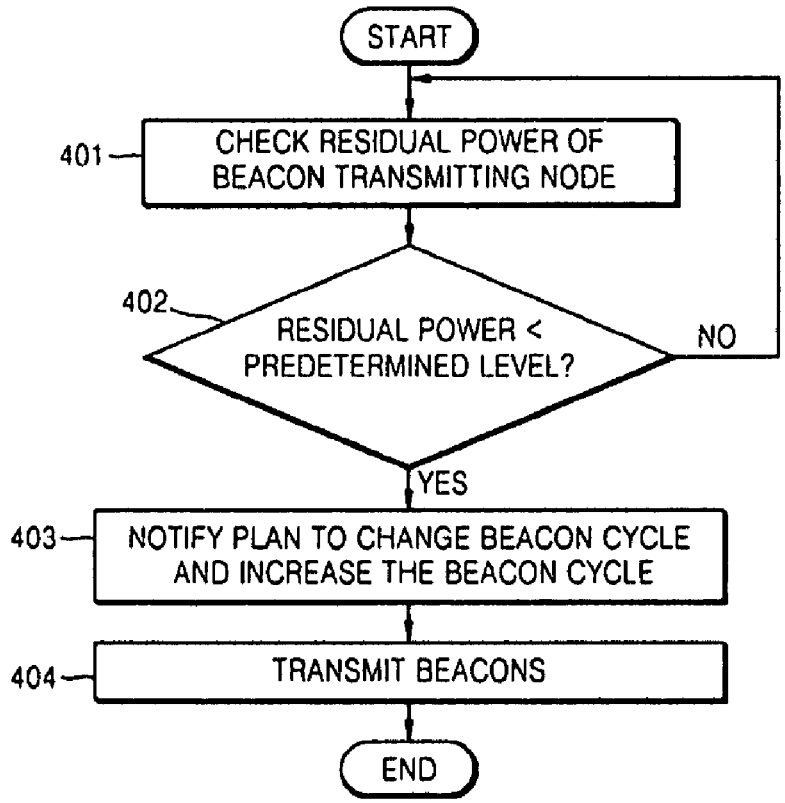
FIG. 4 is a flowchart illustrating a beacon scheduling method in an ad-hoc network according to an embodiment of the present invention.

FIG. 4 is a flowchart illustrating a beacon scheduling method in an ad-hoc network according to an embodiment of the present invention.

Referring to FIG. 4, a beacon transmitting node checks its residual power (in operation 401). If the residual power is lower than a predetermined level (in operation 402), the beacon transmitting node notifies a plan to change its beacon cycle to other nodes and increases the beacon cycle (in operation 403). In operation 404, the beacon transmitting node transmits a beacon at the increased beacon cycles. Herein, the node is an FFD.

Preferably, the beacon includes information about the beacon cycle and information about a use slot that is a beacon transmission point in the beacon cycle. The node determines if an interval between a transmission point of the current beacon and a transmission point of the previous beacon is equal to the increased beacon cycle, measuring the transmission points using a counter for the beacon cycle. The node transmits the beacon if the interval between the transmission point of the current beacon and the transmission point of the previous beacon is equal to the increased beacon cycle.

Figure 5:
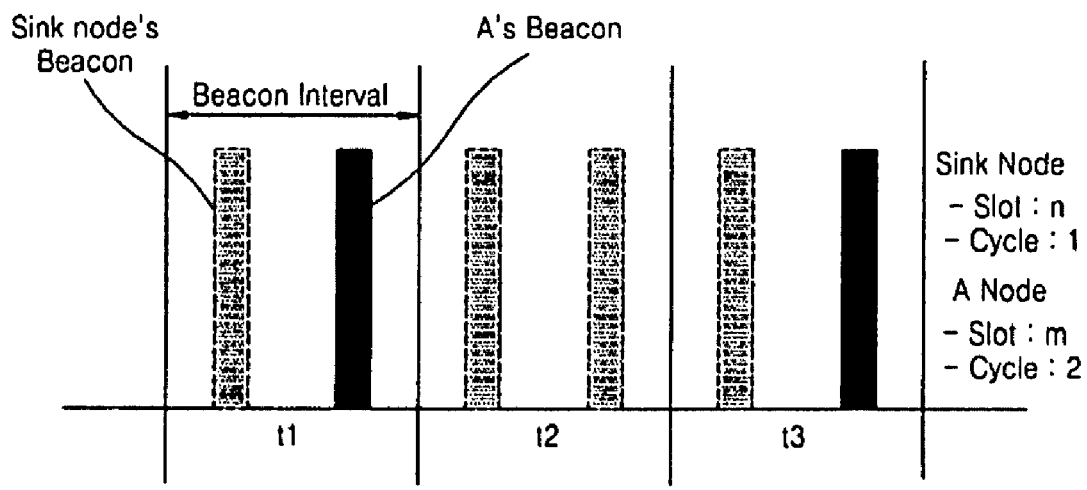
FIG. 5 is a diagram illustrating a beacon transmission point in the case where a node changes a beacon cycle of the node in an ad-hoc network according to an embodiment of the present invention.

FIG. 5 is a diagram illustrating a beacon transmission point in the case where a node changes a beacon cycle of the node in an ad-hoc network according to an embodiment of the present invention.

That is, FIG. 5 illustrates a beacon transmission state in the case where a node A in FIG. 2 changes a beacon cycle from '1' to '2'. Referring to FIG. 5, a sink node transmits a beacon periodically. The node A transmits a beacon in the first beacon interval t1. The node A does not transmit a beacon in the second beacon interval t2. The node A transmits a beacon in the third beacon interval t3. Thus, the node A can save power necessary for transmission of the beacon in the second beacon interval t2 and power necessary for data communication with a child node.

Figure 6:
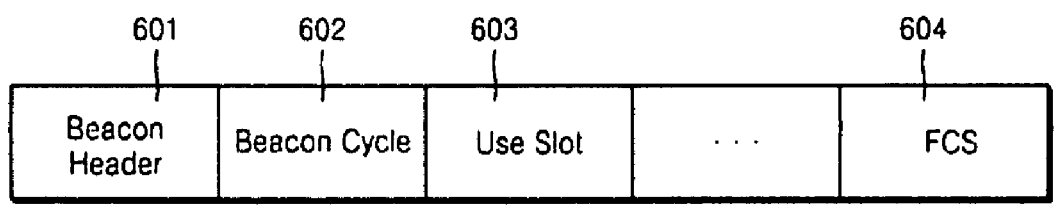
FIG. 6 is a diagram illustrating the structure of a beacon frame including beacon cycle information and use slot information according to an embodiment of the present invention.

FIG. 6 is a diagram illustrating the structure of a beacon frame including beacon cycle information and use slot information according to an embodiment of the present invention.

Referring to FIG. 6, each FFD transmits a beacon periodically. Herein, the beacon includes: a beacon header 601; information about a beacon cycle 602 indicating every how many beacon intervals the beacon is to be transmitted; information about a use slot 603 indicating a beacon transmission point in one beacon interval; and a frame check sequence (FCS) 604.

Figure 7:
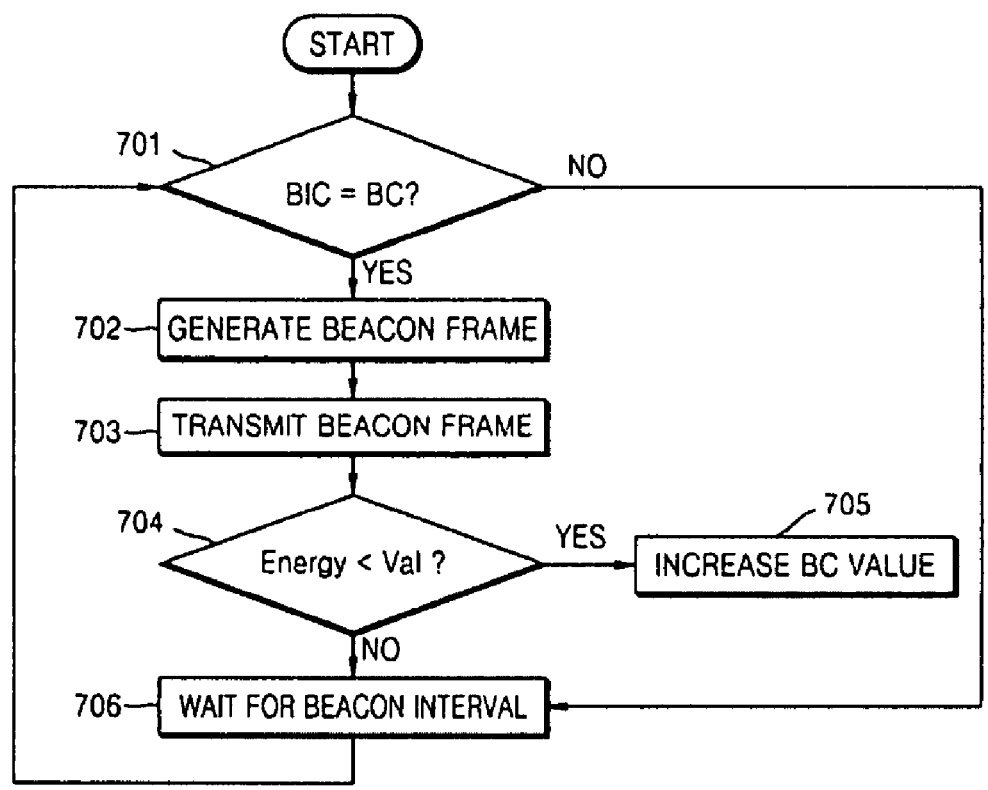
FIG. 7 is a flowchart illustrating a procedure for changing a beacon cycle at a node in an ad-hoc network according to an embodiment of the present invention.

FIG. 7 is a flowchart illustrating a procedure for changing a beacon cycle at a node in an ad-hoc network according to an embodiment of the present invention.

That is, FIG. 7 illustrates an operation of an FFD for changing its beacon cycle. Referring to FIG. 7, an FFD generates and transmits a beacon frame periodically. The FFD manages a beacon interval counter (BIC), that is, a counter for a beacon cycle (BC). Basically, the FFD has a BC value set to '1'. At a beacon transmission point, the FFD determines if the count value of the BIC is equal to the BC value (in operation 701).

Basically, the BC value is set to '1'. Therefore, if the power of the FFD is still sufficient, the FFD immediately generates a beacon frame (in operation 702) and transmits the generated beacon frame (in operation 703). In operation 704, the FFD compares its current power amount with a predetermined value Val. If the current power amount is smaller than the predetermined value Val, the FFD increases the BC value by 1 (in operation 705). After completion of all necessary operations, the FFD changes the count value of the BIC into '0' and waits for the beacon interval (in operation 706).

Thereafter, at the next beacon transmission point, the FFD again compares the count value of the BIC with the BC value (in operation 701). If the count value of the BIC is not equal to the BC value, the FFD increases the count value of the BIC by 1 (in operation 705) and waits for the beacon interval (in operation 706). In this way, the FFD increases the count value of the BIC by 1 until the count value of the BIC is equal to the BC value. When the count value of the BIC is equal to the BC value, the FFD transmits a beacon.

Figure 8:
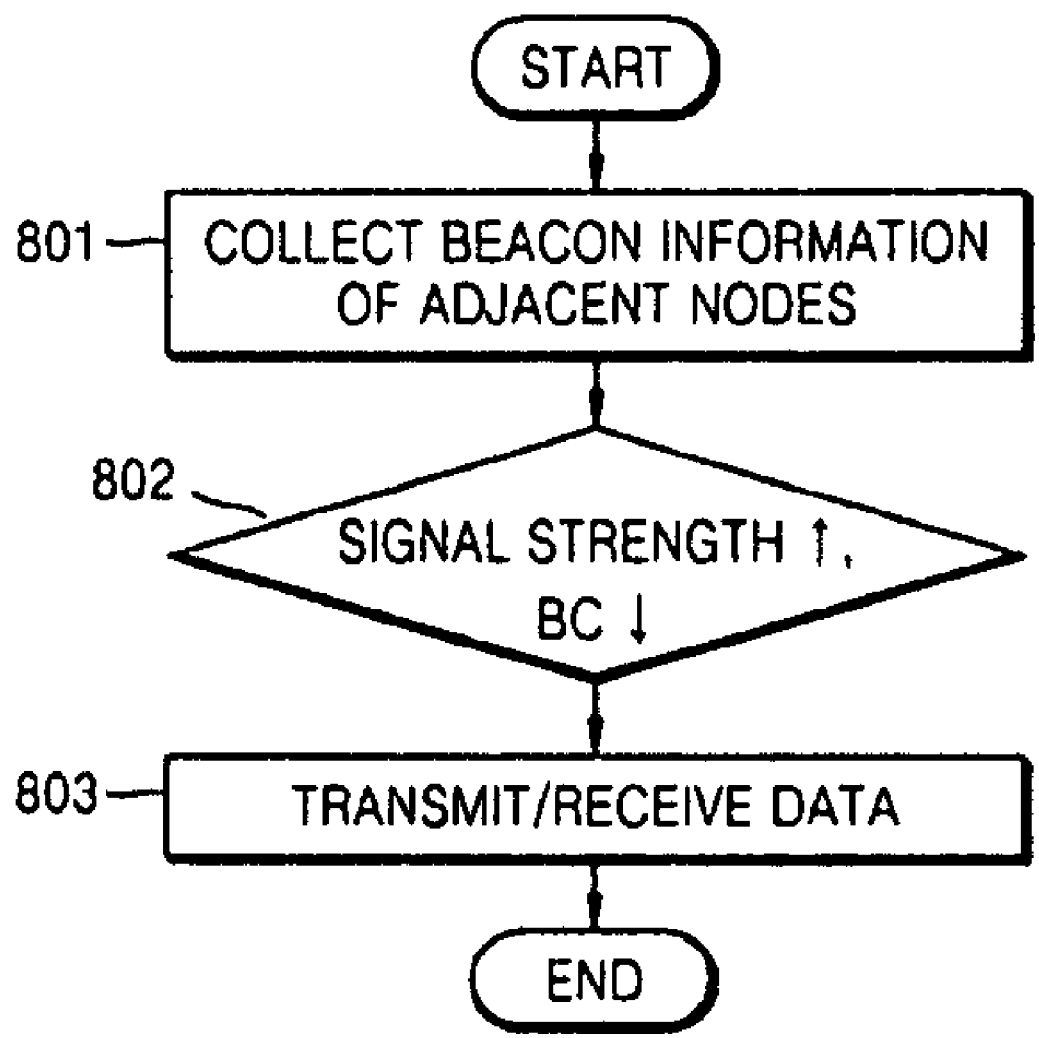
FIG. 8 is a flowchart illustrating a procedure for transmitting/receiving data using beacon cycle information of adjacent nodes collected from the adjacent nodes in an ad-hoc network according to an embodiment of the present invention.

FIG. 8 is a flowchart illustrating a procedure for transmitting/receiving data using beacon cycle information of adjacent nodes collected from the adjacent nodes in an ad-hoc network according to an embodiment of the present invention.

That is, FIG. 8 illustrates an operation of an FFD for selecting another FFD for data transmission. The FFD must connect to another FFD for data transmission. To this end, the FFD collects beacon information of each of adjacent FFDs (in operation 801). The beacon information of each FFD includes information about a signal strength of the FFD, information about a BC of the FFD, and information about a use slot that is a beacon transmission point in the BC of the FFD.

In operation 802, the FFD selects another FFD that transmits strong wireless signals and has a BC of near 1. The reason for this is that a data transmission delay occurs when the BC value is large. Inter-node data transmission delays are accumulated in the total data transmission time. Therefore, selecting an FFD with a large BC is unsuitable for time-critical applications. In operation 803, the FFD transmits data through the selected FFD.

In summary, a data transmitting method in an ad-hoc network includes: collecting at a first node (i.e., a data transmitting node) beacon information of adjacent nodes; selecting a second node with a short BC based on the collected beacon information of the adjacent nodes; and transmitting data from the first node through the second node. More preferably, a node which transmits strong wireless signals and has a short BC is selected as the second node, based on the collected beacon information.

The invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion.

In the beacon scheduling device of a node, the beacon scheduling method, and the data transmitting method according to the present invention, nodes having limited power dynamically change their beacon cycles when data communication occurs frequently. Thus, the life span of each of the nodes can be increased. Therefore, it is possible to reduce an overhead of reconstructing a sensor network.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A beacon scheduling device of a node in an ad-hoc network, comprising:
   a power monitor checking the residual power of the node;
   a beacon change notifier notifying a plan to change a beacon cycle of the node to other nodes if the checked residual power of the node is lower than a predetermined level;
   a beacon changer increasing the beacon cycle; and
   a beacon transmitter transmitting a beacon at the increased beacon cycles.

2. The beacon scheduling device of claim 1, wherein the beacon scheduling device is a full-function device.

3. The beacon scheduling device of claim 1, wherein the beacon changer also increases a beacon payload while increasing the beacon cycle.

4. The beacon scheduling device of claim 1, wherein the power monitor periodically checks the residual power of the node.

5. The beacon scheduling device of claim 1, wherein the beacon cycle is the multiple of a beacon cycle of a sink node or a coordinator.

6. The beacon scheduling device of claim 1, wherein the transmitted beacon includes information about the beacon cycle and information about a use slot that is a beacon transmission point in the beacon cycle.

7. The beacon scheduling device of claim 1, wherein the beacon transmitter transmits the beacon if an interval between a transmission point of the current beacon and a transmission point of the previous beacon is equal to the increased beacon cycle, the transmission points being measured using a counter for the beacon cycle.

8. A beacon scheduling method in an ad-hoc network, comprising:
   checking the residual power of a beacon transmitting node;
   notifying a plan to change a beacon cycle of the node to other nodes if the checked residual power of the node is lower than a predetermined level;
   increasing the beacon cycle of the node; and
   transmitting a beacon at the increased beacon cycles.

9. The beacon scheduling method of claim 8, wherein the node is a full-function device.

10. The beacon scheduling method of claim 8, wherein a beacon payload is also increased when the beacon cycle is increased.

11. The beacon scheduling method of claim 8, wherein the residual power of the node is checked periodically.

12. The beacon scheduling method of claim 8, wherein the beacon cycle is the multiple of a beacon cycle of a sink node or a coordinator.

13. The beacon scheduling method of claim 8, wherein the transmitted beacon includes information about the beacon cycle and information about a use slot that is a beacon transmission point in the beacon cycle.

14. The beacon scheduling method of claim 8, wherein the beacon is transmitted if an interval between a transmission point of the current beacon and a transmission point of the previous beacon is equal to the increased beacon cycle, the transmission points being measured using a counter for the beacon cycle.

* * * * *